(12) United States Patent
Dück et al.

(10) Patent No.: US 7,322,842 B2
(45) Date of Patent: Jan. 29, 2008

(54) MODULAR PLUG CONNECTOR

(75) Inventors: Jakob Dück, Espelkamp (DE); Martin Kleine, Hille (DE); Andreas Nass, Warmsen (DE); Dirk Schmieding, Bad Essen (DE)

(73) Assignee: Harting Electric GmbH & Co. KG (DE)

( * ) Notice: Subject to any disclaimer, the term of this patent is extended or adjusted under 35 U.S.C. 154(b) by 252 days.

(21) Appl. No.: 10/410,993

(22) Filed: Apr. 10, 2003

(65) Prior Publication Data
US 2003/0194914 A1    Oct. 16, 2003

(30) Foreign Application Priority Data
Apr. 13, 2002  (DE) ............................ 202 05 787 U

(51) Int. Cl.
*H01R 13/28*    (2006.01)

(52) U.S. Cl. ................. 439/289; 439/928.1; 439/540.1; 361/730; 200/51.03

(58) Field of Classification Search .. 200/51.02–51.06; 439/289, 532, 540.1, 544, 928, 928.1
See application file for complete search history.

(56) References Cited

U.S. PATENT DOCUMENTS

| 4,336,418 A | * | 6/1982 | Hoag ........................ 200/51 R |
| 4,367,370 A | * | 1/1983 | Wilson et al. ........... 200/51.06 |
| 6,004,162 A |   | 12/1999 | Harting et al. .............. 439/701 |

FOREIGN PATENT DOCUMENTS

| DE | 19707120 | 2/1997 |
| DE | 19851473 | 11/1998 |

\* cited by examiner

*Primary Examiner*—Renee Luebke
*Assistant Examiner*—Larisa Tsukerman
(74) *Attorney, Agent, or Firm*—Hayes Soloway P.C.

(57) ABSTRACT

For a modular plug connector in which different, replaceable modules can be inserted in a hinged retaining frame of two halves, it is proposed to insert modules in the form of sealed enclosures. At least one module is provided with electronic, optoelectronic or pneumatic components for controlling signal functions or generating signal variation for further control tasks.

6 Claims, 5 Drawing Sheets

MODULAR PLUG CONNECTOR

BACKGROUND OF THE INVENTION

The invention relates to a modular plug-in connector having buttable and replaceable modules which are held in a retaining frame composed of two halves, the modules being designed for the termination and relaying of electrical, optical and/or pneumatic signals.

Such a modular plug-in connector is required, in the case of distributed-configuration machine or installation controls, in order to generate, evaluate or relay electrical, electronic, optoelectronic or pneumatic control signals directly at the unit to be controlled, within a plug-in connector.

Known from DE 197 07 120 C1 is a retaining frame for holding plug-in connector modules which is formed from two halves which are pivotally joined to one another, appropriately adapted plug-in connector modules being held positively within the retaining frame.

Additionally disclosed from DE 198 51 473, in a method for coding mechanically connectable parts, is a modular plug-in connector in which there are provided, within one of the modules, means for an electronic coding which contains electronic information on the object to which the modular plug-in connector is connected.

A disadvantage in the case of the hitherto standard plug-in connections is that a control signal must be transmitted centrally from a possibly remotely located control cabinet to a particular installation or machine.

SUMMARY OF THE INVENTION

The invention is therefore based on the object that, in the case of a distributed-configuration installation control, at least one module, in the form of an enclosure, is integrated into a plug-in connector of modular construction in which the control signals required for a control unit or machine are generated in the module in the immediate proximity of the place of consumption.

This object is achieved in that at least one module is made in the form of an enclosure which has a mating side and a termination side for electrical, optical and/or pneumatic terminations, and in that there are provided in the enclosure electronic, electrical, optical and/or pneumatic switching means, by means of which incoming signals can be varied.

The advantages achieved by the invention are, in particular, that, in the case of the distributed supply of signal quantities to control installations and machines, as being successfully propagated at the present time, at least some of these signals are conditioned, in the immediate proximity of the location of origin, in modules which are integrated into corresponding modular plug-in connectors.

Upon joining of the two plug-in connectors, one or more signals from the respective machine or installation parts are supplied to existing electrical, electronic, electromechanical, optoelectrical or, also, pneumatic circuits of a module ranged in a modular plug-in connector, processed and transferred to the mating connector for the purpose of signal relaying.

Functional blocks involved in achieving the object in a module may be: switching relays, electronic components such as diodes, transistors, coils, resistors, capacitors, optical and optoelectronic components, integrated circuits and combinations of the said elements. Furthermore, both analog and digital signals may be used for processing.

In addition, micro-technological systems on substrates, films or 3D-MID technologies may be used in separate enclosures or in an adapted module enclosure.

Simple functions for installation or machine control may thus be advantageously realized, without central switchgear cabinets or additional switchboxes, in the immediate proximity of the signal application—with a substantially reduced wiring expenditure.

BRIEF DESCRIPTION OF THE DRAWINGS

An embodiment example of the invention is explained more fully in the following and represented in the drawing, wherein.

DETAILED DESCRIPTION OF THE INVENTION

Figure 1:
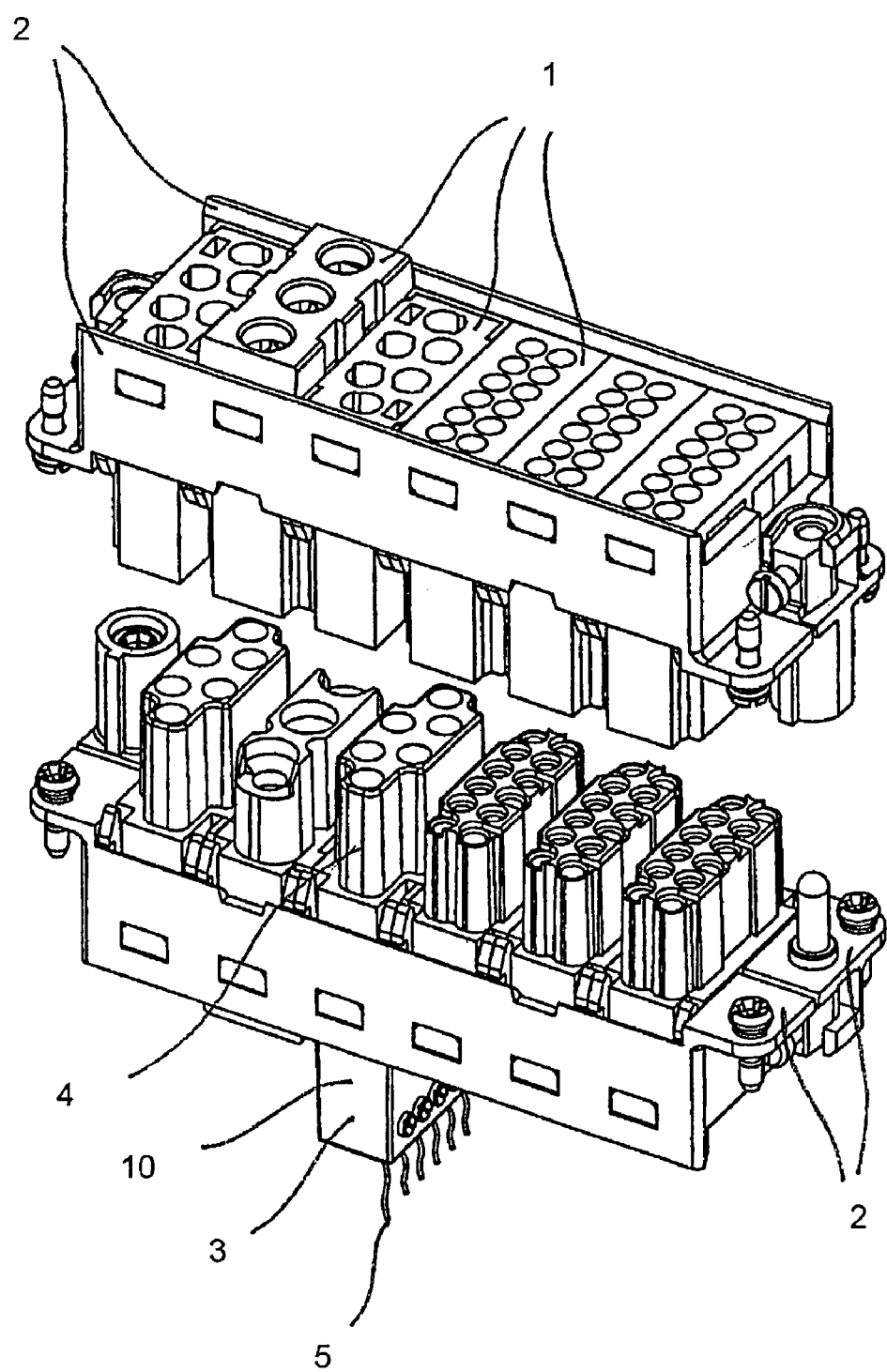
FIG. 1 shows a modular plug-in connector and mating connector with one module.

FIG. 1 shows two modular-construction plug-in connectors, opposed in the plug-in direction, whose different modules 1 are held in a frame 2 composed of two halves, a protective enclosure which surrounds the frame not being represented.

The different modules offer the possibility of adapting an optimized module plug to different transmission signals, for example, to different current intensities, to differently combined units or different physical signal quantities, such as electrical, optical or pneumatic signals.

In addition, there is inserted in the frame a module which, as an enclosure 3, includes a mating side 4 corresponding to a plug-in face of a module 1, and has a termination side with pins 5.

Provided in the module are switching means 10 which, in different ways, vary incoming signals in order to be able to relay them to a mating connector.

Figure 2:
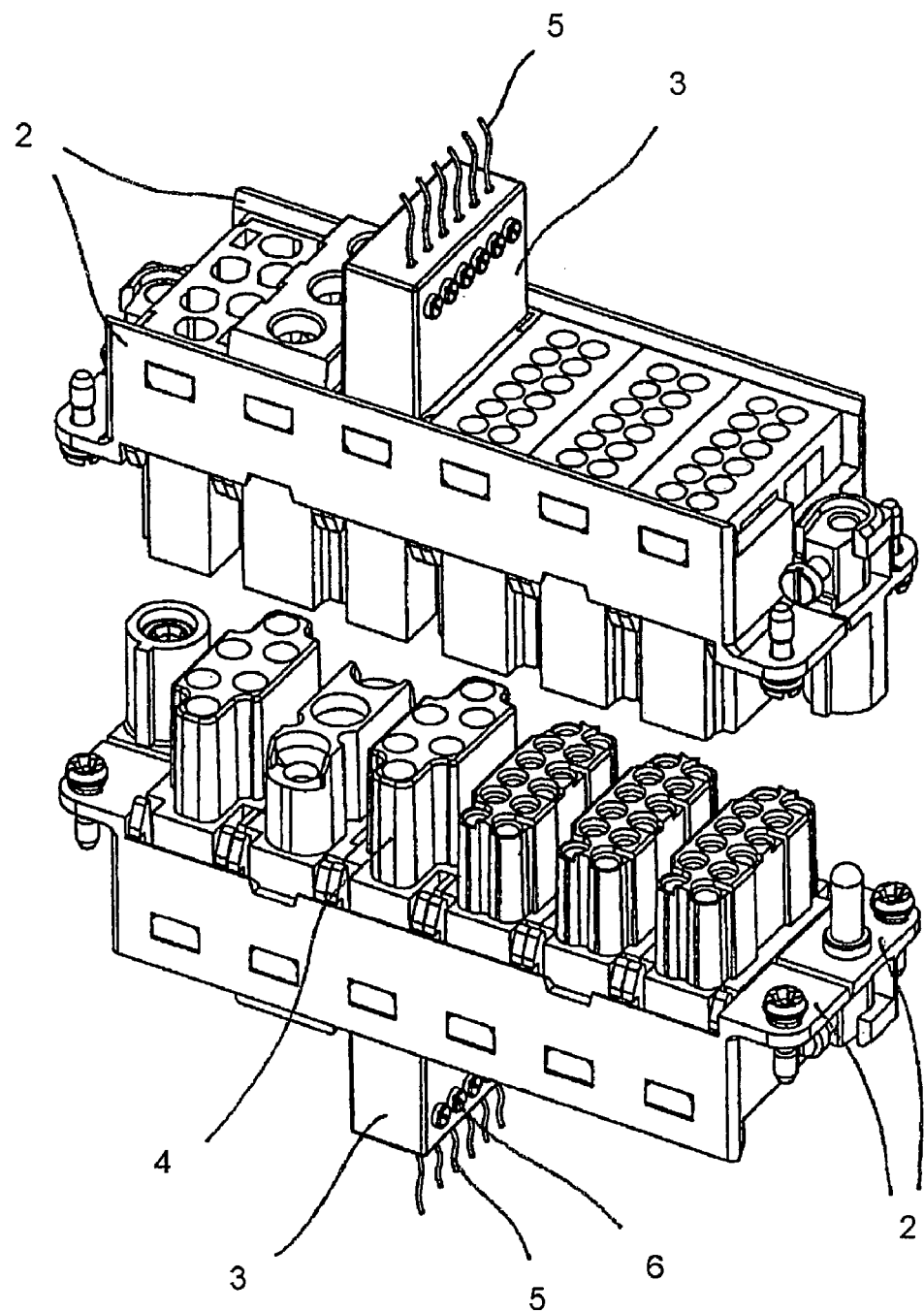
FIG. 2 shows a modular plug-in connector and mating connector with two oppositely disposed modules.

In FIG. 2, there are respectively provided two oppositely disposed modules 3 as in FIG. 1, both having pin-type terminal elements. In this context, the pins may be fixedly joined directly to the switching means in the interior of the enclosure, or the pins are contacted by means of a screw-type clamping connection 6.

Figure 3:
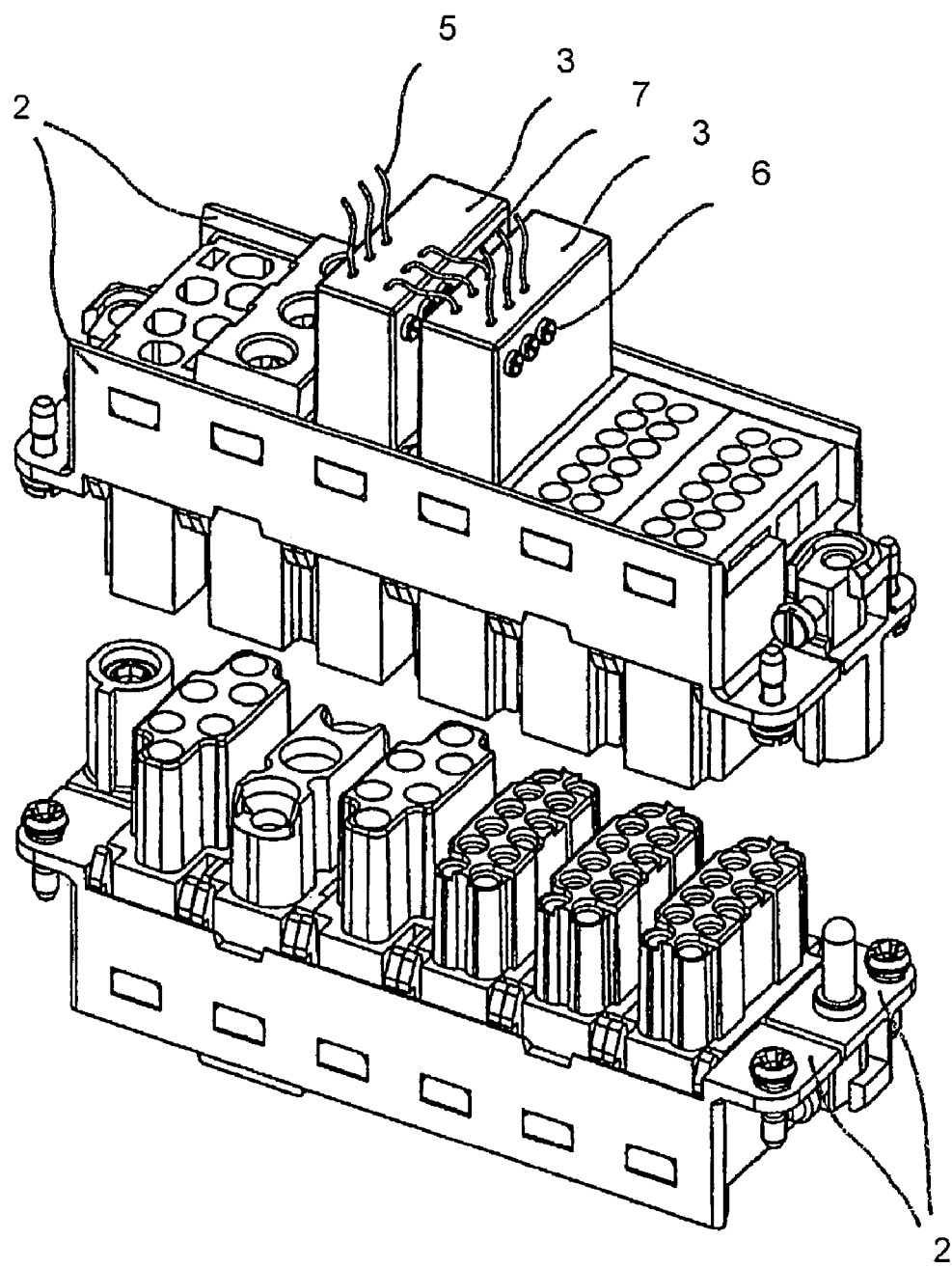
FIG. 3 shows two adjacently disposed modules with digital switching means.

FIG. 3 shows a variant in which two modules 3 are disposed immediately adjacent to one another, a direct electrical connection 7 being provided. In addition, both external terminations 5 and screw-type terminals 6 are provided.

Figure 4:
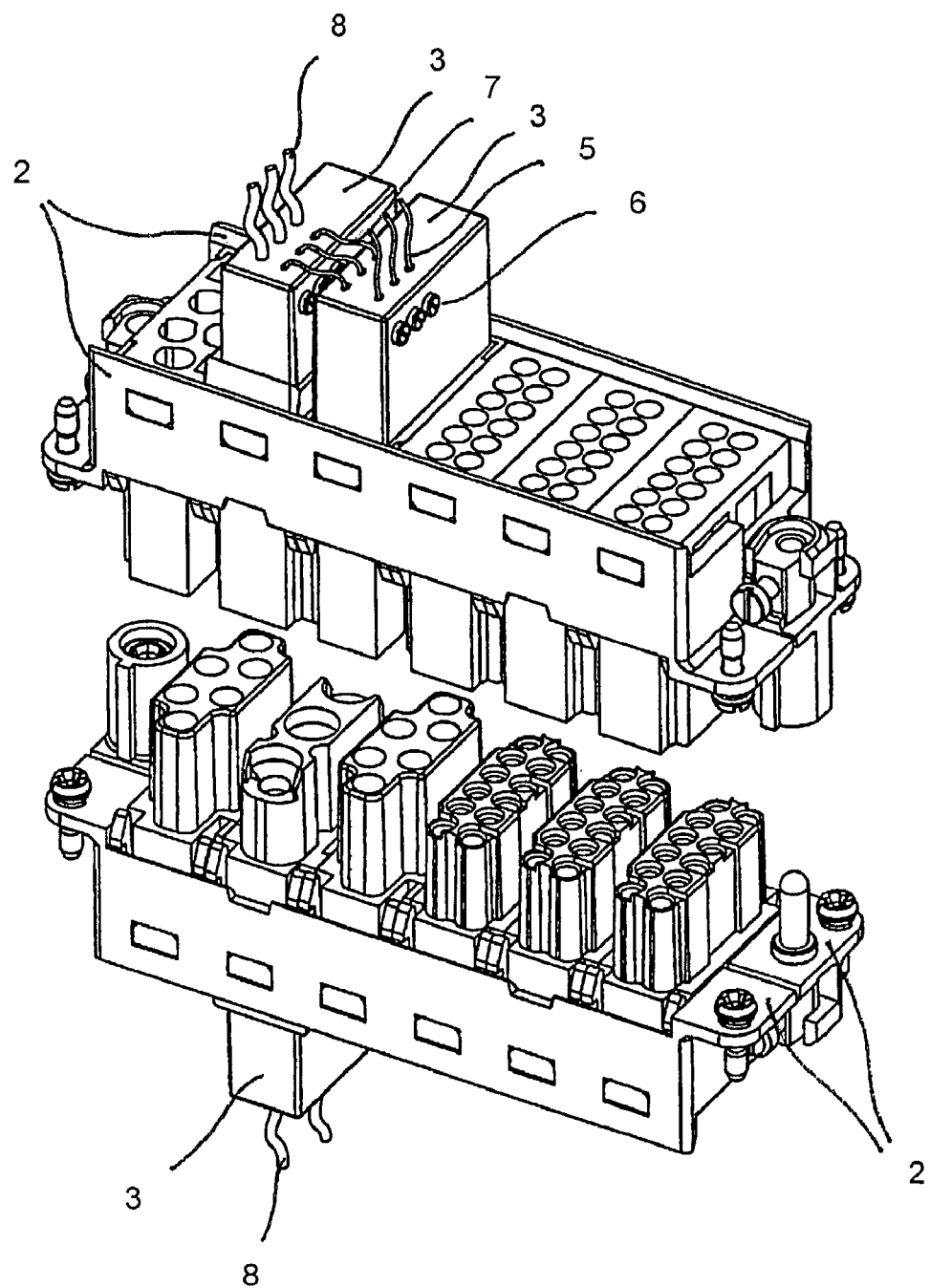
FIG. 4 shows a plurality of modules for a pneumatic control.
Figure 5:
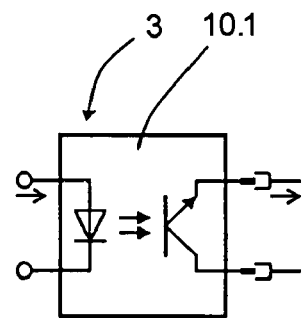
FIGS. 5-8 show a selection of block diagrams, being switching means used in modules according to FIGS. 1-4.

FIG. 4 shows a variant which, as represented as a block diagram in FIG. 5, includes the module 3 with a pneumatic control, for which purpose the pneumatic terminations 8 are provided, for signal transmission.

FIGS. 5-8 show block diagrams which can be used in one of the module enclosures.

Figure 6:
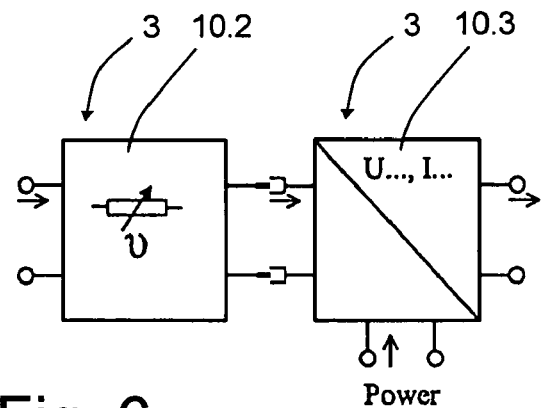
Figure 7:
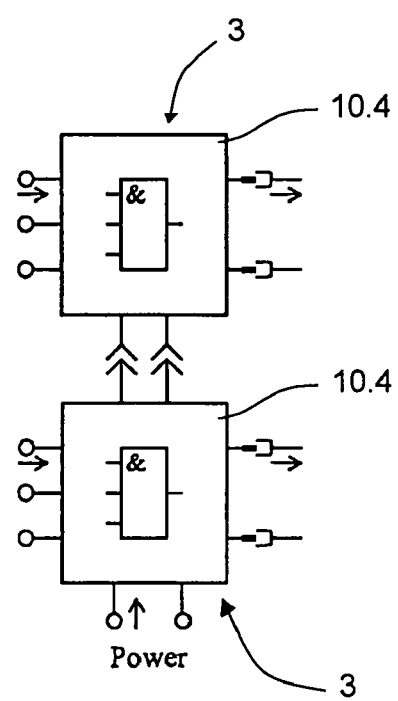
Figure 8:
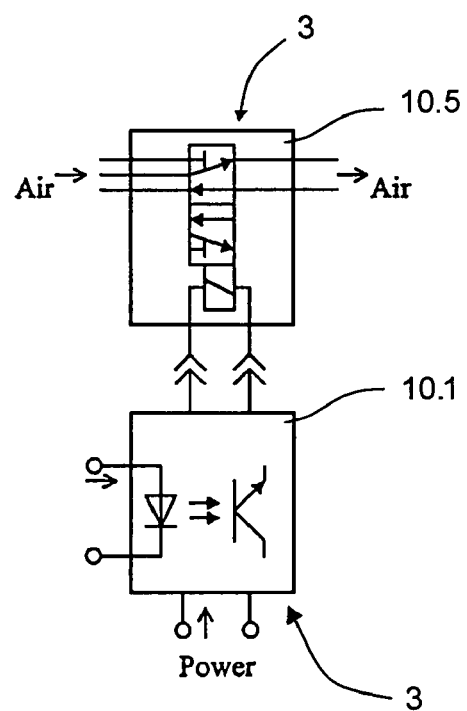

There are several different switching means, for example 10.1 to 10.5 in the modules 3 like: optoelectronic components 10.1 in FIG. 5, analog components 10.2 and 10.3 in FIG. 6, digital components 10.4 in FIG. 7 and pneumatic components 10.5 and optoelectronic components 10.1 in FIG. 8 for a signal regulation function or a signal control function within one of the housings of the modular plug connector.

Optoelectronic componts, pneumatic components, digital and analog components can thus be contained in a module 3 as switching means 10 for a signal regulation function or a signal control function.

The figure partculars entered on the individual block diagrams related to the previously discussed modules inserted in the modular plug-in connectors.

The invention claimed is:

1. A modular plug-in connector having buttable and replaceable modules which are held in a retaining frame composed of two halves, the modules being designed for a termination and transferring of electrical, optical and/or pneumatic signals, wherein at least one module is made as an enclosure which has a mating side and a termination side for electrical, optical and/or pneumatic terminations, and in that there is provided in the enclosure an integrated functional block by which electronic, electrical, optical and/or pneumatic signals may be varied and transferred.

2. The modular plug-in connector according to claim 1, wherein the integrated functional block comprises an electrical, electronic, electromechanical, pneumatic, micro-system or optoelectronic component or subassembly.

3. The modular plug-in connector according to claim 1, wherein the modules are connected, on their termination side, to other modules.

4. The modular plug-in connector according to claim 2, wherein the modules are connected, on their termination side, to other modules.

5. The modular plug-in connector according to claim 1, wherein the functional block comprises at least one element selected from the group consisting of a switching relay, a diode, a transistor, a coil, a resistor, a capacitor, an optical device, and an integrated circuit.

6. The modular plug-in connector according to claim 1, wherein the functional block comprises an analog or a digital signal processor.

* * * * *